(12) United States Patent
Poulsen et al.

(10) Patent No.: US 8,336,465 B2
(45) Date of Patent: Dec. 25, 2012

(54) WIND TURBINE HUB TRANSPORTATION DEVICE

(75) Inventors: Henning Poulsen, Skjem (DK); Jan Emil Westergaard, Brande (DK)

(73) Assignee: Siemens Aktiengesellschaft, Munich (DE)

( * ) Notice: Subject to any disclaimer, the term of this patent is extended or adjusted under 35 U.S.C. 154(b) by 113 days.

(21) Appl. No.: 12/960,712

(22) Filed: Dec. 6, 2010

(65) Prior Publication Data

US 2011/0132239 A1 Jun. 9, 2011

(30) Foreign Application Priority Data

Dec. 8, 2009 (EP) ...................................... 09015206

(51) Int. Cl.
*B65D 19/44* (2006.01)
(52) U.S. Cl. ...................................... 108/55.1; 108/55.3
(58) Field of Classification Search ............... 108/51.11, 108/55.1, 55.3, 55.5; 206/596, 599, 386
See application file for complete search history.

(56) References Cited

U.S. PATENT DOCUMENTS

| | | | | |
|---|---|---|---|---|
| 2,321,063 A * | 6/1943 | Bohnke | ........................ | 206/320 |
| 2,774,474 A * | 12/1956 | Phillips | ........................ | 206/597 |
| 3,334,840 A * | 8/1967 | Vander Pyl et al. | ........ | 242/118.7 |
| 3,654,875 A * | 4/1972 | Vik | .............................. | 108/53.1 |
| 3,962,660 A * | 6/1976 | Duckett | ....................... | 108/53.1 |
| 4,253,569 A * | 3/1981 | O'Connor et al. | ............ | 206/386 |
| 4,257,523 A * | 3/1981 | Blasio | .......................... | 108/55.3 |
| 5,231,808 A * | 8/1993 | Angelette | .................... | 108/55.5 |
| 5,344,013 A * | 9/1994 | Born et al. | .................... | 206/391 |
| 5,507,237 A * | 4/1996 | Barrow et al. | ............... | 108/55.1 |
| 6,126,002 A * | 10/2000 | Brown et al. | ................. | 206/598 |
| 7,044,066 B1 * | 5/2006 | Miller | ......................... | 108/55.3 |
| 7,959,059 B2 * | 6/2011 | Tamamori et al. | ........... | 108/55.3 |
| 7,997,213 B1 * | 8/2011 | Gauthier et al. | ............. | 108/55.1 |

FOREIGN PATENT DOCUMENTS

| | | |
|---|---|---|
| DE | 3430461 A1 | 2/1986 |
| GB | 703861 | 2/1954 |
| GB | 2165210 A | 4/1986 |
| NZ | 241415 A1 | 4/1995 |
| WO | WO 0153162 A1 | 7/2001 |

* cited by examiner

*Primary Examiner* — Jose V Chen (57) ABSTRACT

A wind turbine hub transportation device is provided. The transportation device includes a hub receiving surface for receiving a wind turbine hub, a first beam, a second beam, and a center part connecting the first beam and the second beam. The first and second beam each have at least one first beam connector adapted for connecting the respective beam with a first lifter for lifting the transportation device. The center part includes a center connector adapted for making a connection to a second lifter for lifting the transportation device.

14 Claims, 5 Drawing Sheets

WIND TURBINE HUB TRANSPORTATION DEVICE

CROSS REFERENCE TO RELATED APPLICATIONS

This application claims priority of European Patent Office Application No. 09015206.7 EP filed Dec. 8, 2009, which is incorporated by reference herein in its entirety.

FIELD OF INVENTION

The present invention relates to the field of transportation of wind turbine hubs.

ART BACKGROUND

It is known to store a wind turbine hub on four loose wooden beams. The hub is supported on the four wooden beams during road transport and connected to the trailer by lashing. Also during sea transportation, the hub is supported on four wooden beams and lashed down to the ship deck. The hub is delivered without spinner nose thus enabling to connect lifting gear in the top of the hub. Rigger people need to use a ladder to climb to the top of the hub to connect and disconnect the hub. A typical hub is lifted 12-17 times from leaving the factory to the installation site. Just before lifting the rotor onto the turbine, the spinner nose is installed on the hub. Typically a 6 meter in diameter platform is used for safe access during spinner nose installation.

In view of the above-described situation, there exists a need for an improved handling of a wind turbine hub, while substantially avoiding or at least reducing one or more of the above-identified problems.

SUMMARY OF THE INVENTION

This need may be met by the subject matter according to the independent claims. Embodiments of the herein disclosed subject matter are described by the dependent claims.

According to a first aspect of the invention there is provided a wind turbine hub transportation device (hereinafter referred to as "transportation device"), the transportation device comprising a hub receiving surface for receiving a wind turbine hub, a first beam, a second beam, and a center part connecting the first beam and the second beam. According to an embodiment, the first beam comprises at least one first beam connector adapted for connecting the first beam with a first lifter for lifting the transportation device. According to a further embodiment, the second beam comprises at least one second beam connector adapted for connecting the second beam with the first lifter. According to a further embodiment, the center part comprises a center connector adapted for making a connection to a second lifter for lifting the transportation device.

According to an embodiment, the transportation device is provided in the form of a transportation frame.

In the following, in particular each of the first and second beam connectors is referred to as "beam connector" for brevity. However, it should be understood that irrespective the common term beam connector, the first and second beam connectors may in any case be similar or identical, according to an embodiment. According to other embodiments, the first and second beam connectors are different.

Examples of a (first and/or second) beam connector are: a hook, standard container corners, an eye, bolt, etc.

According to a further embodiment of the first aspect, the transportation device further comprises a third beam connecting the first beam and the second beam and a fourth beam connecting the first beam and the second beam, wherein the third beam and the second beam are positioned at a distance with respect to each other.

According to an embodiment, the third beam and the fourth beam are arranged under an angle with respect to the first and second beams, wherein the angle is different from zero. For example, according to an embodiment, the angle is 90 degrees. According to other embodiments, the angle is around 90 degrees, e.g. the angle may take a value between 80 degrees and 100 degrees, e.g. 90 degrees. According to an embodiment, the four beams are arranged in a generally rectangular shape.

According to a further embodiment, in the transportation device each of the first beam and the second beam have a first end and a second end, wherein each of the first end and the second end comprises one beam connector.

According to an embodiment, at least one beam connector is adapted to receive the fork of a fork lifter.

According to another embodiment, the transportation device further comprises a bottom surface opposite to said hub receiving surface and at least one fastener (adapted) for fastening the transportation device to an underlying device facing the bottom surface. Examples of the underlying device include carriers such as manufacturing plant based carriers, moveable carriers such as a truck or a ship, mounting carriers such as cranes, etc. According to a further embodiment, the fastener is the center connector of the transportation device. For instance, in an embodiment, the transportation device is fastened to a truck or ship by the center connector which is also used for mounting the transportation device to the second lifter.

According to a further embodiment, the center part comprises a through hole and a hollow section surrounding the through hole and being accessible from the through hole, wherein the center connector is located in the hollow section. According to an embodiment, the through hole is defined by a wall, the wall comprising an opening adapted to provide access to the center connector in the hollow section.

According to another aspect of the herein disclosed subject matter, a transportation device for a hub of a wind turbine comprises connectors for connecting the hub to the transportation device and connectors like standard container corners for fastening and/or lifting of the transportation device.

Another aspect of the herein disclosed subject matter relates to a method for assembling of a rotor of a wind turbine with a hub mounted to a transportation device as disclosed herein where the transportation device with the hub is further mounted upon a lifter for placing the transportation frame with the hub above ground.

An aspect of the herein disclosed subject matter comprises the use of a transportation device as disclosed herein for transportation, storage and/or lifting of a hub and/or assembling of a rotor of a wind turbine on the ground.

The wind turbine hub transportation device according to the herein disclosed subject matter works, according to respective embodiments, as a storage or transportation pallet, a lifting fixture, a fastening unit during transportation and/or as an adapter for rotor assembling.

In the following there will be described exemplary embodiments of the subject matter disclosed herein with reference to a transportation device. However, other embodiments are described with reference to a method of operating the transportation device, to a method of mounting a wind turbine hub to the transportation device, a method of assembling a rotor of a wind turbine or a use of the transportation device. It has to be pointed out that of course any combination of features relating to different aspects of the herein disclosed subject matter is also possible. For example, a person skilled in the art will gather from the above and the following description that, unless other notified, in addition to any combination of features belonging to the transportation device with features relating to one of the above mentioned methods is possible and considered to be at least implicitly disclosed with this application. Further it should be understood that unless otherwise noted, method features implicitly disclose respective device features, e.g. requiring the transportation device to be respectively configured.

The aspects and embodiments defined above and further aspects and embodiments of the present invention are apparent from the examples to be described hereinafter and are explained with reference to the drawings, but to which the invention is not limited.

DETAILED DESCRIPTION

The illustration in the drawings is schematic. It is noted that in different figures, similar or identical elements are provided with the same reference signs or with reference signs, which are different from the corresponding reference signs only within the first digit or within an appended character. Further, the description of elements or features which are described with regard to a specific figure is not repeated for subsequent figures containing similar or identical elements or features.

Figure 1:
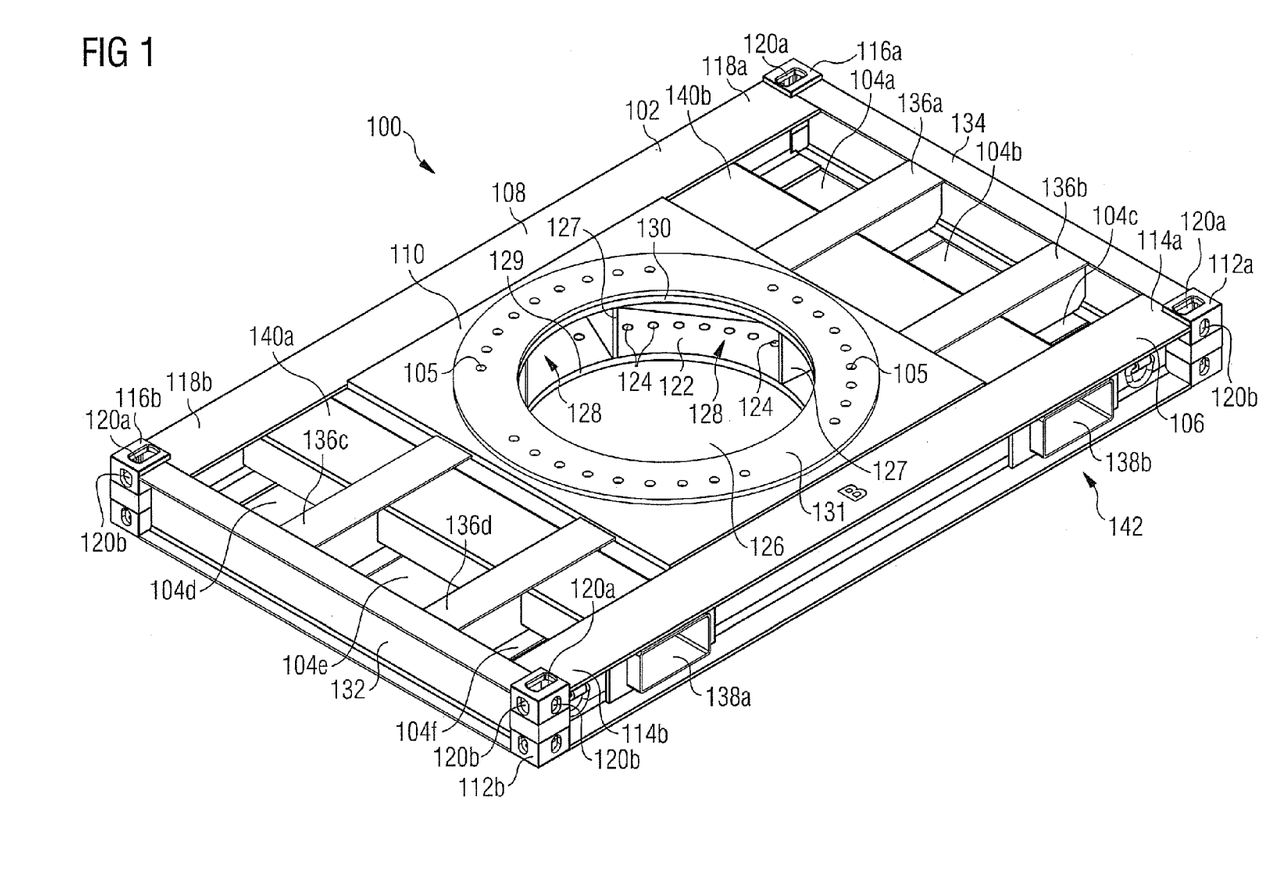
FIG. 1 shows a perspective top view of a wind turbine hub transportation device according to embodiments of the herein disclosed subject matter.

FIG. 1 shows a perspective top view of a wind turbine hub transportation device 100 according to embodiments of the herein disclosed subject matter.

The transportation device 100 has a hub receiving surface, generally indicated at 102 in FIG. 1. The hub receiving surface 102 is configured for receiving a wind turbine hub. The hub receiving surface 102 may be a closed surface without openings or, as shown in FIG. 1, an open surface having openings 104a, 104b, 104c, 104d, 104e, 104f. According to an embodiment, the surface topology of the receiving surface is adapted to a mounting surface topology of the hub. Further, according to an embodiment the transportation device comprises a hub connector, e.g. in the form of a plurality of holes, two of which are indicated at 105 in FIG. 1, for connecting the hub to the hub receiving surface 102.

In accordance with embodiments of the herein disclosed subject matter, the transportation device 100 has a first beam 106 and a second beam 108. Further, the transportation device 100 has a center part 110 connecting the first beam 106 and the second beam 108.

The first beam 106 comprises one first beam connector 112a, 112b at each end 114a, 114b of the first beam 106. Likewise, the second beam 108 comprises one second beam connector 116a, 116b at each end 118a, 118b of the first beam 106.

The beam connectors 112a, 112b, 116a, 116b are adapted for connecting the first beam with a first lifter for lifting the transportation device. According to an embodiment, each beam connector 112a, 112b, 116a, 116b includes at least one eye 120a, 120b configured for receiving a rope (not shown) for lifting the transportation device. According to a further embodiment, each beam connector may comprise a first eye 120a and a second eye 120b, which are configured and arranged such that a rope or similar element can be fed trough both eyes. According to an embodiment shown in FIG. 1, beam connectors 112a, 112b, 116a, 116b are corners of the transportation device 100 and the first and second eyes 120a, 120b are located on different faces of the corners. According to an embodiment, the corners are pre-manufactured corners, such as standard container Corners.

In accordance with a further embodiment, the center part 110 comprises a center connector 122 adapted for making a connection to a second lifter for lifting the transportation device. Hence, in one embodiment, the transportation device 100, having the wind turbine hub mounted thereon, may be lifted by the first lifter using the beam connectors 112a, 112b, 116a, 116b. Having the transportation device lifted off, the second lifter may be attached to the center connector 122.

According to an embodiment, the first lifter is a crane or the like and the second lifter comprises a connector (not shown) configured for attachment to the center connector 122. The connector of the second lifter may be of mating shape compared to the center connector 122. For example, according to an embodiment, the connector of the second lifter is of generally tubular shape, having an end face that is attachable to the center connector 122. Such a connector is sometimes referred to as "elephant foot". Attachment of the center connector 122 to the second lifter may be performed in any suitable way, e.g. by a threaded connection, e.g. using threaded bolts. Hence, according to an embodiment, the center connector 122 comprises a plurality of holes, some of which are indicated at 124 in FIG. 1, for attachment of the transportation device to the second lifter. Into the holes 124, threaded bolts may be inserted in order to mount the transportation device to the second lifter by means of the threaded bolts and respective nuts. According to other embodiments, other connection elements are used instead of bolts and nuts.

According to an embodiment, the center part 110 comprises a through hole 126 and at least one hollow section, two of which are indicated at 128 in FIG. 1. The hollow section 128 surrounds the through hole 126. The center connector 122 is at least partially located in the hollow section 128 and is accessible via the through hole 126. According to a further embodiment, alternatively or additionally, the hub connector 105 is at least partially located in the hollow section and is accessible via the through hole 126.

According to an embodiment where two or more hollow sections are provided, the hollow sections are separated by walls 127 which connect a lower plate 129 and a spaced apart upper plate 130 of the center part 110. According to an embodiment, the center connector includes the lower plate 129. According to an embodiment, both the lower plate 129 and the upper plate 130 are attached to the walls 127, e.g. by welding, gluing, or any other suitable means. The attachment of these three components provides sufficient strength for carrying a wind turbine hub while at the same time allows for a reduced weight by respectively adjusting the thicknesses of the plates and the walls. According to a further embodiment, a reinforcing element 131 may be provided for reinforcing the upper plate 130. According to an embodiment, the reinforcing element 131 is ring shaped and extends around the through 126. According to another embodiment, the reinforcing element also serves to adjust the surface topology of the upper plate and the hub receiving surface.

According to a further embodiment, the through hole 126 is defined by a circumferential wall which extends between the lower plate 129 and the upper plate 130. The circumferential wall may comprise openings configured to provide access to the hollow section 128, and hence to the center connector and or the hub connector.

According to another embodiment (not shown), the holes 124 are threaded holes that allow attachment of the second lifter without access to the hollow section 128. In such an embodiment, the through hole may be omitted.

In another embodiment, the transportation device comprises a third beam 132 connecting the first beam 106 and the second beam 108. Further, a fourth beam 134 connecting the first beam 106 and the second beam 108 may be provided. The four beams may be arranged to form a generally rectangular shape, as shown in FIG. 1. According to an embodiment, the four beams 106, 108, 132, 134 are attached to each other by the corners 112a, 112b, 116a, 116b. According to other embodiments any other suitable attachment process, such as e.g. welding, may be employed to attach the beams to each other.

According to an embodiment, auxiliary beams 136a, 136b, 136c, 136d are attached between the center part 110 and the third and fourth beams 132, 134. These auxiliary beams, which according to an embodiment extend in parallel to the first and second beams 106, 108, provide for additional stiffness and load bearing capacity of the transportation device 100.

According to a further embodiment, alternatively, or, as shown in FIG. 1, additionally to the above described beam connectors 112a, 112b, 112c, 112d, first and second beam connectors in the form of through holes 138a, 138b in the respective beam are provided, the through holes 138a, 138b allowing for insertion of a fork of a fork lifter. Hence, according to an embodiment, the first lifter is a fork lifter. Further, a channel element 140a, 140b may be provided between the through holes in the first beam and the second beam, thereby facilitating insertion of the fork in the through hole of the second beam 108 opposite the insertion front face 142.

Figure 2:
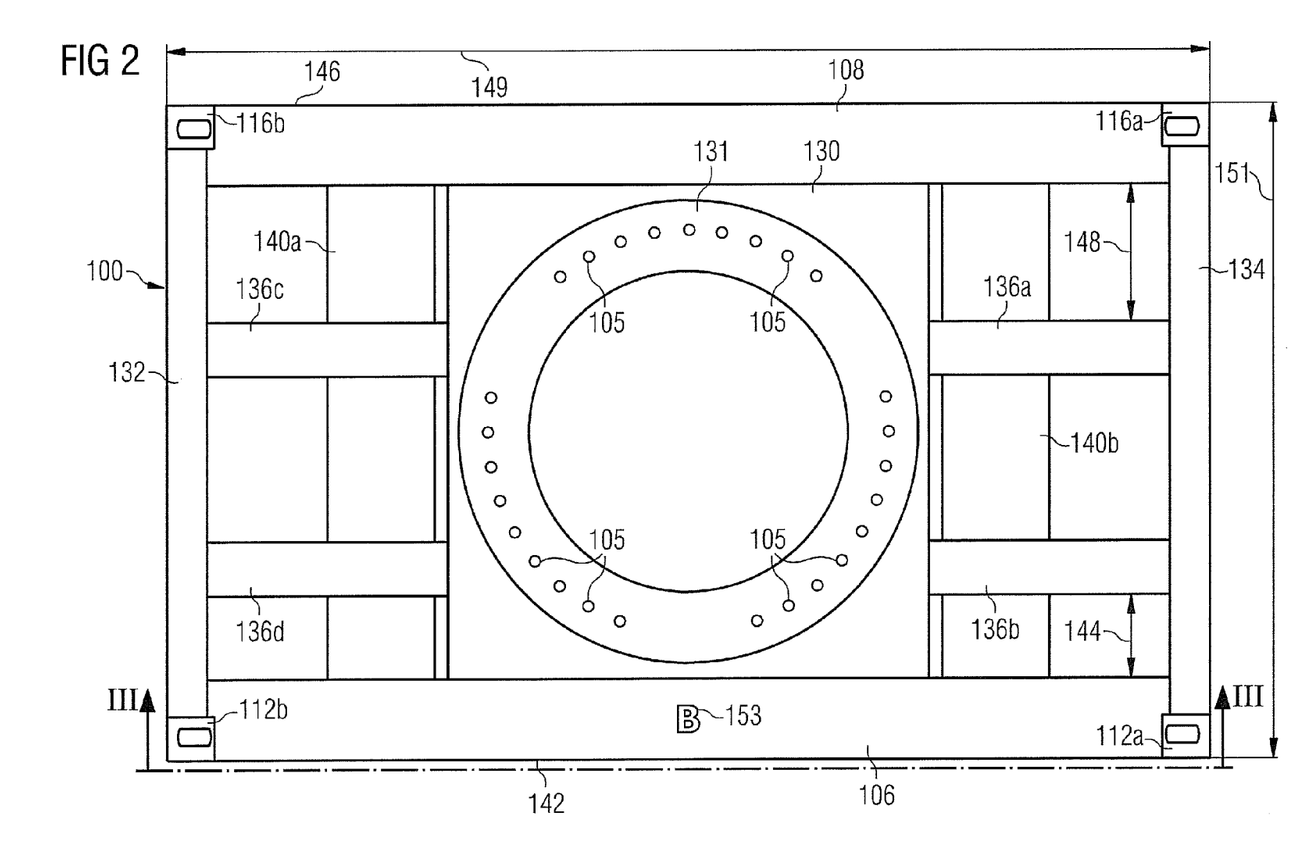
FIG. 2 shows a top plan view of the transportation device in FIG. 1.

FIG. 2 shows a top plan view of the transportation device of FIG. 1.

According to an embodiment, a predetermined number of rotor blades is mounted to the wind turbine hub before the hub is mounted to the wind turbine. In an exemplary embodiment, three rotor blades are mounted to the wind turbine hub, resulting in an uneven distribution of forces over the transportation device 100. Accordingly, walls 127 and/or the auxiliary beams 136a, 136b, 136c, 136d may be unevenly distributed in order to account for a non-uniform load exerted by the wind turbine hub with mounted blades. Further, walls 127 and/or the auxiliary beams 136a, 136b, 136c, 136d may be unevenly distributed in order to account for non-uniform forces exerted by the first lifter, e.g. a fork lifter. Such non-uniform forces may in particular arise due to non-negligible wind forces acting on the blades during the installation process of the rotor to final position/site at the wind turbine.

Accordingly, the auxiliary beams 136b, 136d which are close to the front face 142 are located at a first distance 144 from the first beam 106, whereas auxiliary beams 136a, 136c which are located close to a rear face 146, opposite the front face 142, are located at a second distance 148 from the second beam 108. According to a further embodiment, where a hub is mounted to the transportation device such that two rotor blades are close to the front face and one rotor blade is close to the rear face, the first distance 144 is smaller than the second distance 146, as shown in FIG. 2.

In one embodiment a group of mounting holes 105 is provided below each rotor blade, wherein the location of the group of holes corresponds to the location of a rotor blade, when the hub 100 is installed on the transportation device. In other words, a group of holes is provided in the hub 100 below the receptacles for the rotor blades and mating mounting holes 105 are provided by the hub connector of the transportation device 100. For example, if two rotor blades are positioned close to the front face 142, in one embodiment indicated by the respectively located two groups of mounting holes 105, the distance 144 between the auxiliary beams 136b, 136d and the first beam 106, which are close to the front face 142, is reduced compared to the distance 148 between the auxiliary beams 136a, 136c and the second beam 108, which are close to the rear face 146. As those skilled in the art will appreciate, a reduced distance between beams corresponds to an increased beam density per area unit.

According to an embodiment, at least one lateral dimension, e.g. the width 151 of the transportation device 100 is smaller than the diameter of the wind turbine hub (not shown in FIG. 2). According to a further embodiment, at least one lateral dimension, e.g. the width 151 is equal to the standard container width. This allows for effective packaging on carriers such as trucks or ships, at least when handling empty transportation devices 100 without hub mounted thereon. According to a further embodiment, at least one lateral dimension, e.g. the length 149, of the transportation device 100 is larger than the wind turbine hub to be transported and e.g. larger than a standard container length.

According to an embodiment, the transportation device 100 comprises a marker 153 which has a corresponding counterpart on the wind turbine hub. Hence the marker allows correct alignment of the hub and the transportation device 100. This helps to ensure that the hub is mounted in the correct orientation to the transportation device which might advantageous if the transportation device is adapted on an unequal force distribution exerted/exertable by the hub.

Figure 3:
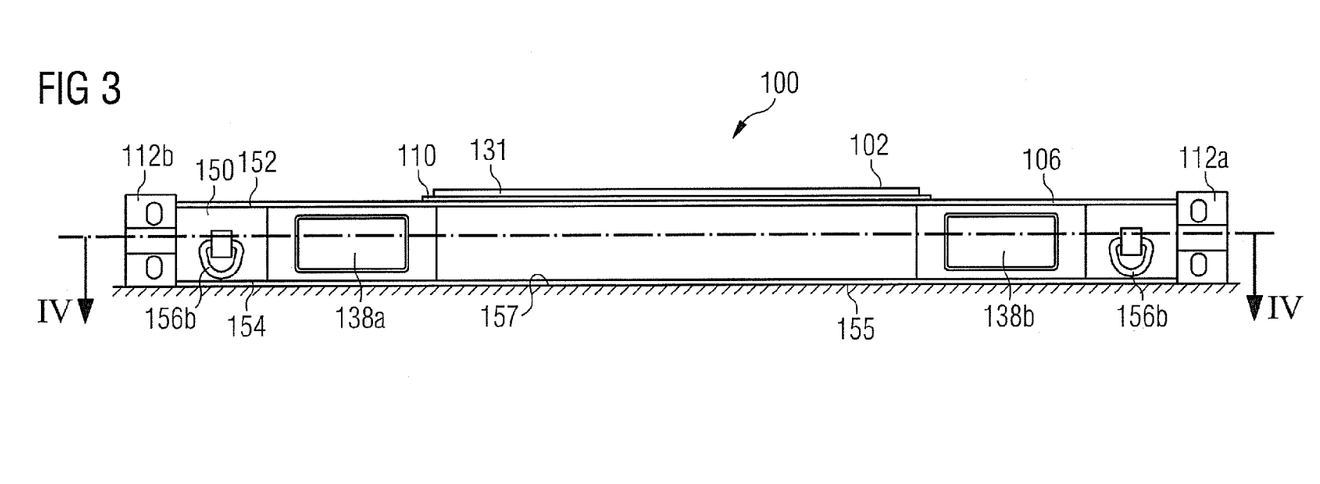
FIG. 3 shows a side plan view of the transportation device according to line III-III in FIG. 2.

FIG. 3 shows a front plan view of the transportation device of FIG. 1 according to arrows III-III in FIG. 2. According to an embodiment, at least some of the beams of the transportation device 100, e.g. the first beam 106 is an I-shaped beam, having a relatively thin center portion 150 (first depth in FIG. 3 perpendicular to the drawing plane) and a broader top portion 152 and bottom portion 154 (second depth in FIG. 3, larger than the first depth).

FIG. 3 illustrates a bottom surface 155 of the transportation device 100, the bottom surface 155 being opposite to said hub receiving surface 102. According to an embodiment, the transportation device 100 comprises at least one fastener 112a, 112b, 156a, 156b for fastening the transportation device 100 to an underlying device 157 facing the bottom surface 155.

Figure 4:
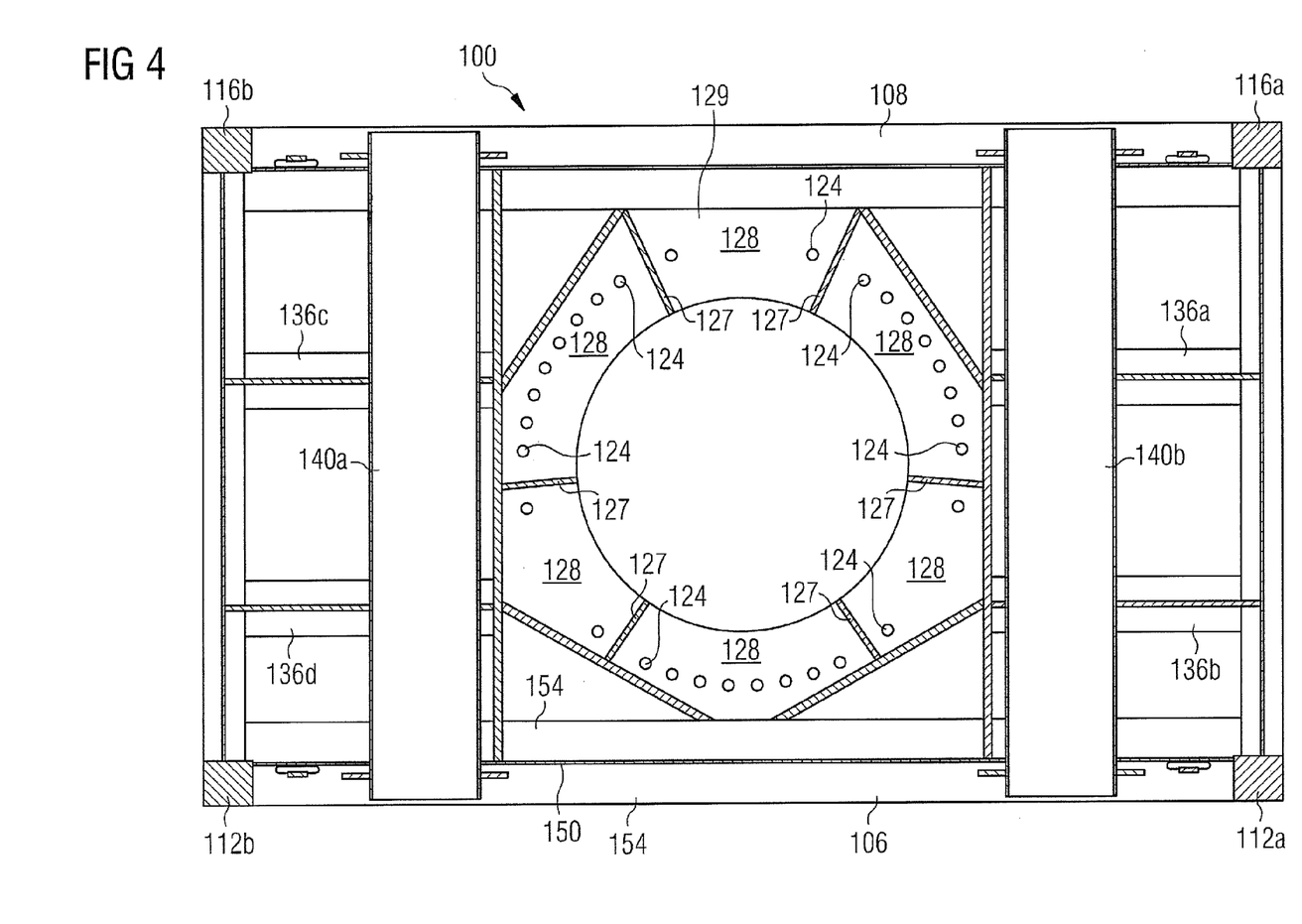
FIG. 4 shows a sectional view of the transportation device of FIG. 1 according to line IV-IV in FIG. 3.

Further defined in FIG. 3 is a section plane Iv-Iv, corresponding to the sectional view of the transportation device 100 in FIG. 4.

FIG. 4 shows a sectional view of the transportation device along plane Iv-Iv of FIG. 3. According to an embodiment, the shape of the lower (bottom) plate 129 may different from the shape of the upper (top) plate 130. For example, according to an embodiment shown in FIG. 1, the upper plate 130 may be of rectangular shape. According to a further embodiment, the bottom plate 129 may be of a generally hexagonal shape. According to an embodiment, the hexagonal shape of the bottom plate may be distorted to account for uneven distribution of forces described above. Further, according to an embodiment also the density of walls 127 per area unit is adapted to the uneven distribution of forces exerted by the hub or by a lifting device.

Figure 5:
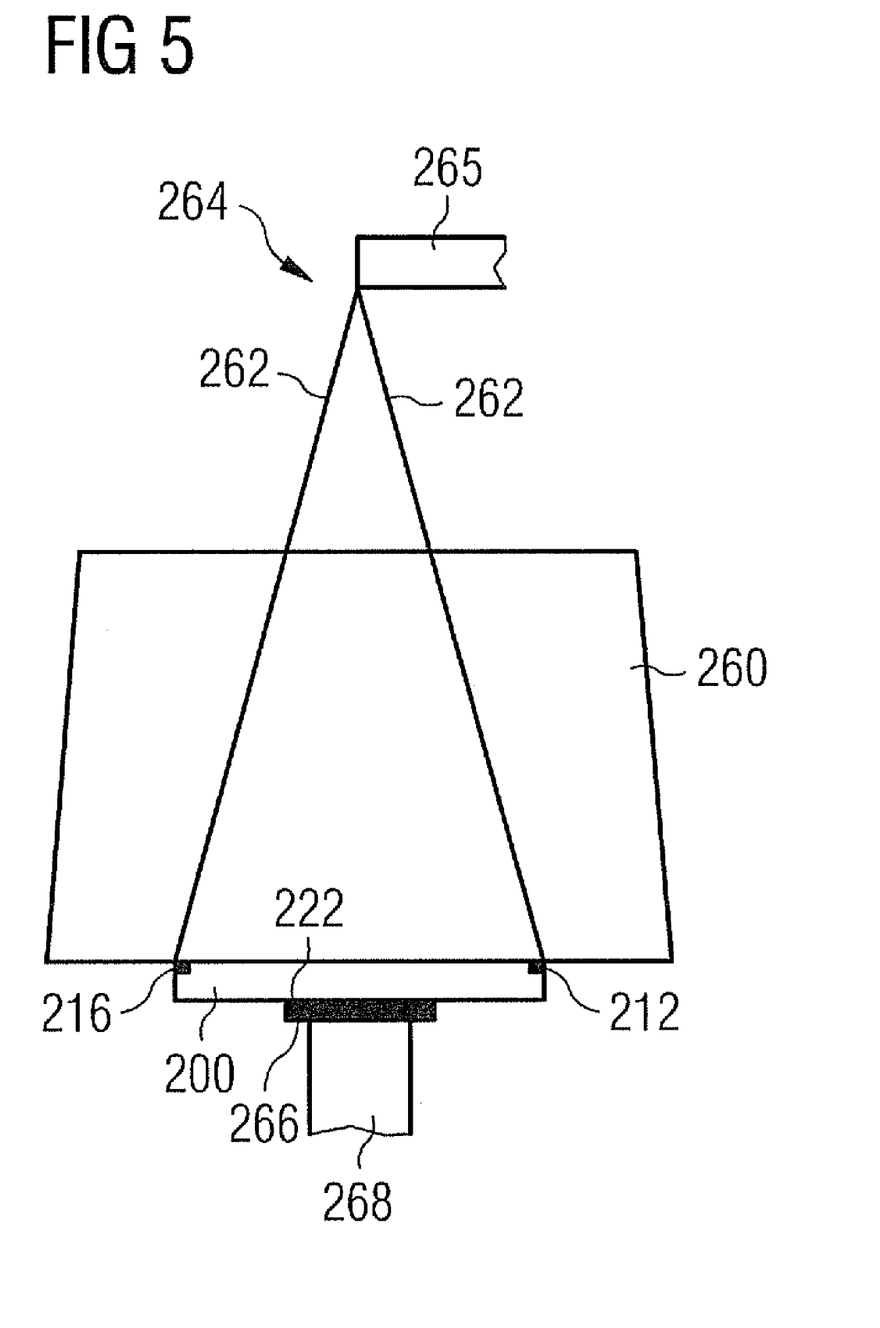
FIG. 5 shows a partial view of first and second lifters for lifting a transportation device according to embodiments of the herein disclosed subject matter.

FIG. 5 shows an exemplary use of a transportation device 200 according to embodiments of the herein disclosed subject matter. In particular, FIG. 5 illustrates handling of a transportation device 200 having a wind turbine hub 260 mounted thereon. It should be understood that the hub 260 is shown schematically, as is the rest of FIG. 5. Hence, although present, receptacles for the rotor blades are not shown in FIG. 5.

The transportation device 200 comprises beam connectors 212, 216 which are connected to ropes 262 of a first lifter 264 which ropes in turn are connected to an arm 265 of the first lifter 264 (only partially shown in FIG. 5). The transportation device 200 is liftable by the first lifter 264. For example, the transportation device 200 may be lifted off a truck (not shown) by means of the first lifter 264. Subsequently, a connector 266 (e.g. in form of an elephant foot) of a second lifter 268 is attached to a center connector 222 of the transportation device 200. Subsequently, the first lifter 264 may be detached from the transportation device. The result is the transportation device 200 together with the hub 260 mounted on the second lifter 268. This configuration allows for save mounting of the rotor blades as well as of the spinner nose (not shown in FIG. 5). Since the transportation device according to the herein disclosed subject matter allows for simultaneous attachment to the first lifter and the second lifter (which is of course different from the first lifter), the transportation device allows for a save handover of the transportation device from the first lifter to the second lifter, and vice versa if necessary.

A suitable material for the transportation device according to the herein disclosed subject matter is metal, e.g. steel or stainless steel. However, when the dimensions of the beams are properly adapted, a large variety of materials may be used instead of metal.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

An illustrative embodiment of a wind turbine hub transportation device comprises a hub receiving surface for receiving a wind turbine hub, a first beam, a second beam, and a center part connecting the first beam and the second beam. The first and second beam each comprise at least one first beam connector adapted for connecting the respective beam with a first lifter for lifting the transportation device. The center part comprises a center connector adapted for making a connection to a second lifter for lifting the transportation device.

According to embodiments of the herein disclosed subject matter, the transportation device is provided in the form of a transportation frame comprising four beams connected to each other in a rectangular shape with a large upper and bottom area and with fastening means like e.g. corner castings (standard container corners) connected to each corner both at the upper and at the bottom side of the frame, and with plates or other similar means connected to the frame on the upper and bottom side having mounting holes, threaded or unthreaded, for mounting of a hub on the upper side of the frame, and for mounting of an elephant foot or other connector on the bottom side of the frame. The elephant foot comprises e.g. a large tube or other similar means for lifting up the frame with the hub for rotor assembling on the ground. Rotor assembling is described in EP 2 003 333 A1 and herein in particular with regard to FIG. 3. The transportation frame might also have means for receiving a fork of e.g. a fork lift for local handling of the transportation frame together with the hub.

According to respective embodiments, the transportation device works in the following ways:

As a supporting foot or pallet when the hub is put on a storage area.

As a pallet when the hub is to be moved by a fork lift. The frame has means like through going holes in the frame for receiving the fork of e.g. a fork lift).

As a lifting fixture when the hub is to be lifted upwards by e.g. a crane, wherein wires could be connected to the corner castings of the transportation frame. The rigger people can connect the lifting gear on the transportation frame without using a ladder or other access means.

As a transportation foot or pallet with fastening or securing means (e.g. corner castings) during transportation on a truck.

As a fastening unit on a ship or train using e.g. corner castings to fasten the transportation frame with the hub to the ship or train. I As an adapter between the hub and a so-called elephant foot when the rotor of the wind turbine is assembled on the ground (the rotor mainly comprising a hub, spinner, pitch bearings and blades). In this way it is possible to complete the hub with spinner nose from the factory, as the lifting gear is connected to the transportation frame instead of the top of the hub. It is also not necessary to use a large platform on site for safe access during spinner nose installation.

By the herein disclosed transportation device, e.g. in the form of a transportation frame, it is much easier to handle the hub during storage, transportation and assembling as the transportation device allows handling of the hub from storage to installation and comprises the means for securing and lifting the hub and assembling of the rotor of a wind turbine. In this way, time and related costs are saved.

The transportation frame is much more stable during transportation or storage than e.g. wooden beams or similar supporting means for the hub.

By embodiments of the herein disclosed subject matter it is possible to complete the hub with spinner nose before mounting the hub at the installation site, as the lifting gear is connected to the transportation frame instead of the top of the hub. In this way it is not necessary to have a mounting platform on site for safe access during spinner nose installation.

The lifting gear can be connected to the transportation frame by the rigger people without using further access means like a ladder.

The truck transportation of the hub connected to the transportation device is quite safe in case of accident, as the frame can easily secured to the truck.

The transportation device comprises in one embodiment both upper and bottom corner castings in each corner for fastening, securing and lifting. According to an embodiment, the transportation device is equipped with mounting holes on the upper side for mounting of different kinds or sizes of hubs used for different kinds or sizes of wind turbines.

According to an embodiment, there might also be provided mounting holes on the bottom side of the transportation frame for connecting e.g. a connector of a lifter (e.g. a so-called elephant foot). The transportation frame might also have means like through holes going through the frame, for receiving a fork of e.g. a fork lift for local handling of the transportation frame with the hub.

The invention claimed is:

1. Wind turbine hub transportation device, comprising:
a hub receiving surface for receiving a wind turbine hub;
a bottom surface opposite to the hub receiving surface;
a first beam;
a second beam;
a fastener for fastening the transportation device to a further device facing the bottom surface; and
a center part arranged between the first beam and the second beam,
wherein the first beam comprises a first beam connector adapted to connect the first beam to a first lifter for lifting the transportation device,
wherein the second beam comprises a second beam connector adapted to connect the second beam to the first lifter,
wherein the center part comprises a center connector for connecting a second lifter for lifting the transportation device,
wherein the center connector is the fastener for fastening the transportation device to the further device and for mounting the transportation device to the second lifter.

2. The transportation device according to claim 1, further comprising:
a third beam connecting the first beam and the second beam; and
a fourth beam connecting the first beam and the second beam.

3. The transportation device according to claim 1, wherein:
the first beam comprises two first beam connectors,
the second beam comprises two second beam connectors,
the first beam and the second beam each have a first end and a second end,
the first end and the second end of the first beam each comprise one of the two first beam connectors; and
the first end and the second end of the second beam each comprise one of the two second beam connectors.

4. The transportation device according to claim 2, wherein:
the first beam comprises two first beam connectors,
the second beam comprises two second beam connectors,
the first beam and the second beam each have a first end and a second end,
the first end and the second end of the first beam each comprise one of the two first beam connectors; and
the first end and the second end of the second beam each comprise one of the two second beam connectors.

5. The transportation device according to claim 1, wherein the first beam connector is adapted to receive the fork of a fork lifter.

6. The transportation device according to claim 1, wherein the second beam connector is adapted to receive the fork of a fork lifter.

7. The transportation device according to claim 1, wherein:
the center part comprises a through hole,
the center connector is accessible via the through hole.

8. A method of assembling a rotor of a wind turbine with a hub mounted to a transportation device, the method comprising:
providing a transportation device including a hub, wherein the transportation device comprises a hub receiving surface and a bottom surface opposite the hub receiving surface;
lifting the transportation device with the hub;
placing the transportation device with the hub at a desired location above ground; and
fastening the transportation device to a further device facing the bottom surface by a center part of the transportation device.

9. The method according to claim 8, further comprising:
receiving the wind turbine hub by the hub receiving surface;
providing a first beam, and a second beam wherein the center part is arranged between the first beam and the second beam;
connecting the first beam to a first lifter for lifting the transportation device via a first beam connector of the first beam;
connecting the second beam to the first lifter via a second beam connector of the second beam; and
connecting a second lifter for lifting the transportation device via a center connector of the center part.

10. The method according to claim 9, wherein:
the first beam comprises two first beam connectors,
the second beam comprises two second beam connectors,
the first beam and the second beam each have a first end and a second end,
the first end and the second end of the first beam each comprise one of the two first beam connectors; and
the first end and the second end of the second beam each comprise one of the two second beam connector.

11. The method according to claim 9, further comprising:
adapting the first beam connector in order to receive a fork of a fork lifter.

12. The method according to claim 9, further comprising:
adapting the second beam connector in order to receive a fork of a fork lifter.

13. The method according to claim 8, further comprising:
connecting the first beam and the second beam via a third beam; and
connecting the first beam and the second beam via a fourth beam.

14. The method according to claim 9, wherein:
the center part comprises a through hole, and
the center connector is accessible via the through hole.

* * * * *